(12) United States Patent
Stilling

(10) Patent No.: US 7,099,577 B2
(45) Date of Patent: Aug. 29, 2006

(54) OPTICAL TRANSMISSION SYSTEM WITH BIDIRECTIONAL CONNECTION PATHS AND METHOD FOR SETTING UP AT LEAST ONE BIDIRECTIONAL CONNECTION PATH

(75) Inventor: Bernd Stilling, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 665 days.

(21) Appl. No.: 10/184,439

(22) Filed: Jun. 28, 2002

(65) Prior Publication Data

US 2003/0007219 A1 Jan. 9, 2003

(30) Foreign Application Priority Data

Jun. 28, 2001 (DE) ................................ 101 31 210

(51) Int. Cl.
*G02F 1/00* (2006.01)
*H04J 14/00* (2006.01)

(52) U.S. Cl. ................................ 398/4; 398/66; 398/67
(58) Field of Classification Search ................ 398/1–8, 398/43–79

See application file for complete search history.

(56) References Cited

U.S. PATENT DOCUMENTS 6,839,514 B1 * 1/2005 Sharma et al. .................. 398/2
2003/0161632 A1 * 8/2003 Wang ........................... 398/48

OTHER PUBLICATIONS

"Control of Lightpaths in an Optical Network" Chaudhuri et al., pp. 1-14.
"Extensions to RSVP-TE for Bidirectional Optical Path Setup", Guo et al, Jan. 2001, pp. 1-5.

* cited by examiner

*Primary Examiner*—Kenneth Vanderpuye
*Assistant Examiner*—David Lee
(74) *Attorney, Agent, or Firm*—Bell, Boyd & Lloyd LLC

(57) ABSTRACT

In order to set up a bidirectional connection path in an optical transmission system composed of a number of switched optical network nodes having a number of unidirectional terminating units, in which each unidirectional terminating unit of a network node is connected to a unidirectional terminating unit of a further network node via a unidirectional connection path section, an adaptation layer is provided via which at least two unidirectional terminating units of an optical network node which have opposite transmission directions are combined to form one bidirectional terminating unit and addressed together. As a result, the setting up of the bidirectional connection paths is improved in a particularly advantageous way in terms of the duration and the signaling complexity.

3 Claims, 3 Drawing Sheets

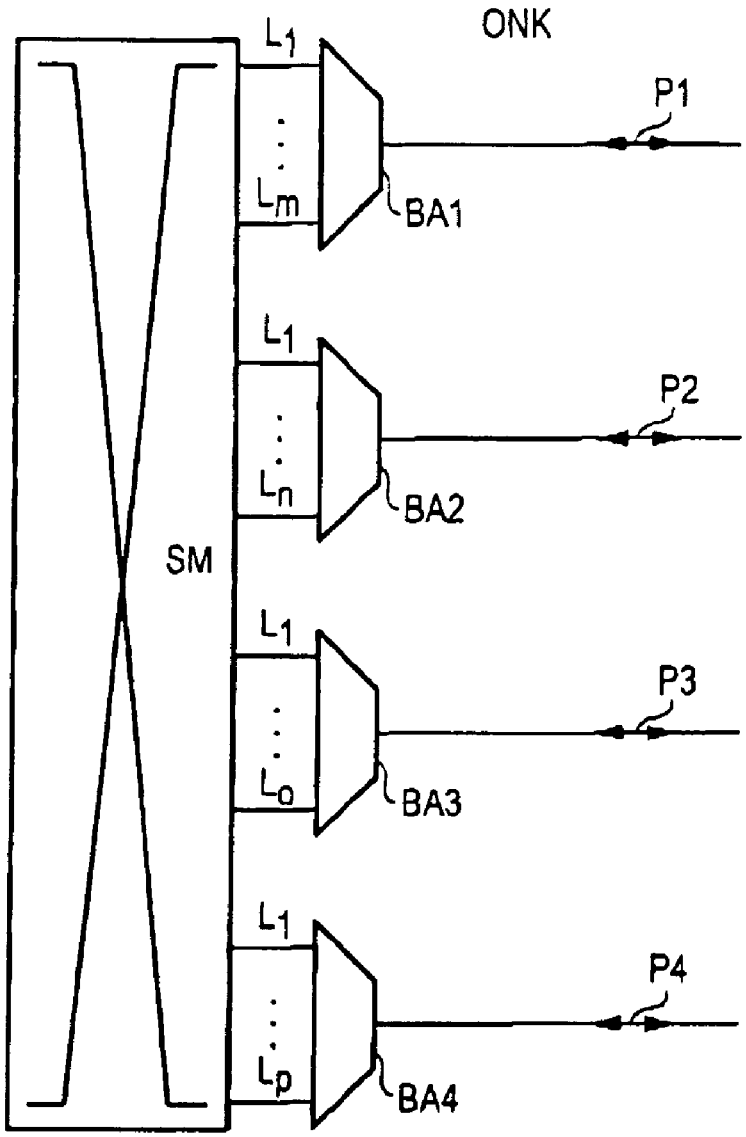

OPTICAL TRANSMISSION SYSTEM WITH BIDIRECTIONAL CONNECTION PATHS AND METHOD FOR SETTING UP AT LEAST ONE BIDIRECTIONAL CONNECTION PATH

BACKGROUND OF THE INVENTION

The present invention relates to an optical transmission system composed of a number of switched optical network nodes having a number of unidirectional terminating units, in which each unidirectional terminating unit of a network node is connected to a unidirectional terminating unit of a further network node via a unidirectional connection path section. In addition, the present invention relates to a method for setting up at least one bidirectional connection path from a first optical network node to an N-th optical network node via at least one connection path section in such an optical transmission system.

In optical transmission systems, particularly wavelength division multiplexing (WDM) transmission systems, optical data signals are transmitted at different data rates. In order to implement high transmission capacities, a number of optical signals having different wavelengths, such as WDM signals, are transmitted as a single optical transmission signal or data signal. For this purpose, optical transmission systems have optical cross connectors, or optical network nodes, which are, for example, connected in series and which are connected to one another via, for example, point-to-point connections using optical connecting fibers. In such a case, optical connections are set up, maintained and released via a number of optical cross connectors or optical network nodes.

However, the operators of optical transmission networks and systems wish to increase the flexibility of the adaptation of such optical transmission systems to dynamically changing traffic volumes or traffic requirements. For this purpose, switching matrices are provided in the optical network nodes which permit flexible switching over of the optical data streams or optical data signals on the basis of individual wavelengths. This is referred to as dynamic "wavelength routing".

By automating this "optical channel layer," i.e., by providing an automatically switched optical transmission system (automatically switched optical network) (ASON), the restoration times and the connection setup times in the case of a fault are considerably reduced.

In particular, the setting up of bidirectional connections in an automatically switched optical transmission system (ASON) is of interest for the operators of such optical transmission systems. The physical layer which is provided for this is implemented in such an optical automatically switched transmission system (ASON) via unidirectional optical connection paths. To set up a bidirectional optical connection path, two unidirectional optical connection paths are therefore necessary; i.e., two separate optical connection paths are provided for the forward and backward transmission directions. For this purpose, a first unidirectional connection path is first set up in the forward direction and then a second unidirectional connection path is set up in the backward direction. As a result, a considerable degree of signaling complexity is required to set up bidirectional connection paths in optical transmission systems (ASON).

In the article "Control of Lightpaths in an Optical Network", Sid Chaudhuri, et al., Optical Internetworking Forum, a method is described, for example, in which a bidirectional optical connection path is set up in two separate stages. Here, a unidirectional connection path is first set up in the forward direction and then a further unidirectional connection path is set up in the backward direction. Both forward and backward directions of a bidirectional connection path usually take the same route, or the same optical fiber path, in the optical switched transmission system. In each case, the same wavelength is typically used for a unidirectional optical connection path ("link") for the forward and backward directions. In the connection path setup described in the publication, the setting up of a bidirectional connection path is only possible with considerable additional signaling complexity. For example, in the method in question, it is necessary to ensure that, during the setting up of the forward direction, the resources necessary for the backward direction, such as optical fiber link, wavelength, etc., within the optical transmission system are in no way enabled for the setting up of further connection paths, but rather are reserved for the current optical connection. The two-stage character of the method described leads to connection setup times which are approximately twice as long as those for the connection setup of a unidirectional connection. A further disadvantage of such a method for setting up a bidirectional connection path is the significantly longer time required for the connection setup.

In addition, a one-stage method for setting up a bidirectional connection path is known from the publication "Extensions to RSVP-TE for Bi-directional Optical Path Setup", by Don Guo et al., Network Working Group, January 2001. Here, the wavelengths which are used for setting up the forward and backward directions for a bidirectional connection path can be selected as desired so that the setting up of the bidirectional connection path can be carried out approximately simultaneously. However, in this method it is not ensured that, in each case, the same wavelength is provided for setting up the forward and backward directions of an optical bidirectional connection path. In the method in question, the forward and backward directions each disadvantageously take separate routes (i.e., are routed via different optical connection paths or optical fibers), in the optical WDM transmission system. As a result, in the event of a fault, the fault diagnosis or the fault localization is made considerably more difficult.

An object of the present invention, therefore, is to provide an optical transmission system and a method for setting up bidirectional connection paths in this optical transmission system with a number of switched optical network nodes which simplifies the setting up of bidirectional connection paths.

SUMMARY OF THE INVENTION

The significant advantage of the optical transmission system according to the present invention is that, for setting up a bidirectional connection path, an adaptation layer is provided via which at least two unidirectional terminating units of an optical network node which have opposite transmission directions are combined to form one bidirectional terminating unit and addressed together. As a result of the inventive provision of an adaptive layer via which two opposed unidirectional terminating units are addressed as a single bidirectional terminating unit, it is possible, in a particularly advantageous way, to set up a bidirectional connection path without additional time being required, and signaling protocols which are implemented for the unidirectional connection setup in an optical transmission system, such as CR-LDP or RSVP-TE, can continue to be used for setting up bidirectional connections after slight modifications.

A further key aspect of the present invention includes a method for setting up at least one bidirectional connection path from a first optical network node to an N-th optical network node via at least one connection path section in an optical WDM transmission system, in which an optical administration network node which is responsible for the assignment of the bidirectional connection path channels on the at least one connected connection path section and which is connected to the connection path section (FA1 to FA3) in question is determined in each optical network node. Furthermore, a "label request message" which contains a path identification number and the destination node address of the bidirectional connection path to be set up is transmitted in the transmission direction (downstream) along the bidirectional connection path (BVP), in each case from one optical network node to the following optical network node. The bidirectional connection paths which are available for the connection path section in question are determined in the optical administration network node via the labels made available by the adaptation layer, and one available label is selected per connected connection path section, the label which is selected for the connection path section between the administration network nodes and the following nonadministration network node being signaled to the nonadministration network node via the "label request message". In addition, in the opposite transmission direction along the bidirectional connection path, a "label mapping message" which contains a path identification number is transmitted, in each case, from one optical network node to the following optical network node, the label which is selected for the connection path section between an administration network node and the following nonadministration network node being signaled by the administration network node to the following nonadministration network node via the "label mapping message". The bidirectional connection path channel which is defined via the transferred label is switched through into the optical nonadministration network node. The method according to the present invention advantageously ensures that during the setting up of a bidirectional connection path the forward and backward transmission directions always take the same route, it being possible for the assignment of the wavelength for the forward and backward transmission directions to be carried out individually for each optical connection path section. In addition, the method according to the present invention particularly advantageously defines a fixed assignment of the wavelengths for the forward and backward directions, as a result of which a rapid and simple connection setup can be carried out via the bidirectional connection path which is set up. The locating of faults is also made significantly simpler using the method according to the present invention.

Additional features and advantages of the present invention are described in, and will be apparent from, the following Detailed Description of the Invention and the Figures.

BRIEF DESCRIPTION OF THE FIGURES

FIG. 2 shows, by way of example, the optical network node which can be addressed via the adaptation layer according to the present invention.

FIG. 3 shows, by way of example, a first and a second assignment table.

DETAILED DESCRIPTION OF THE INVENTION

Figure 1:
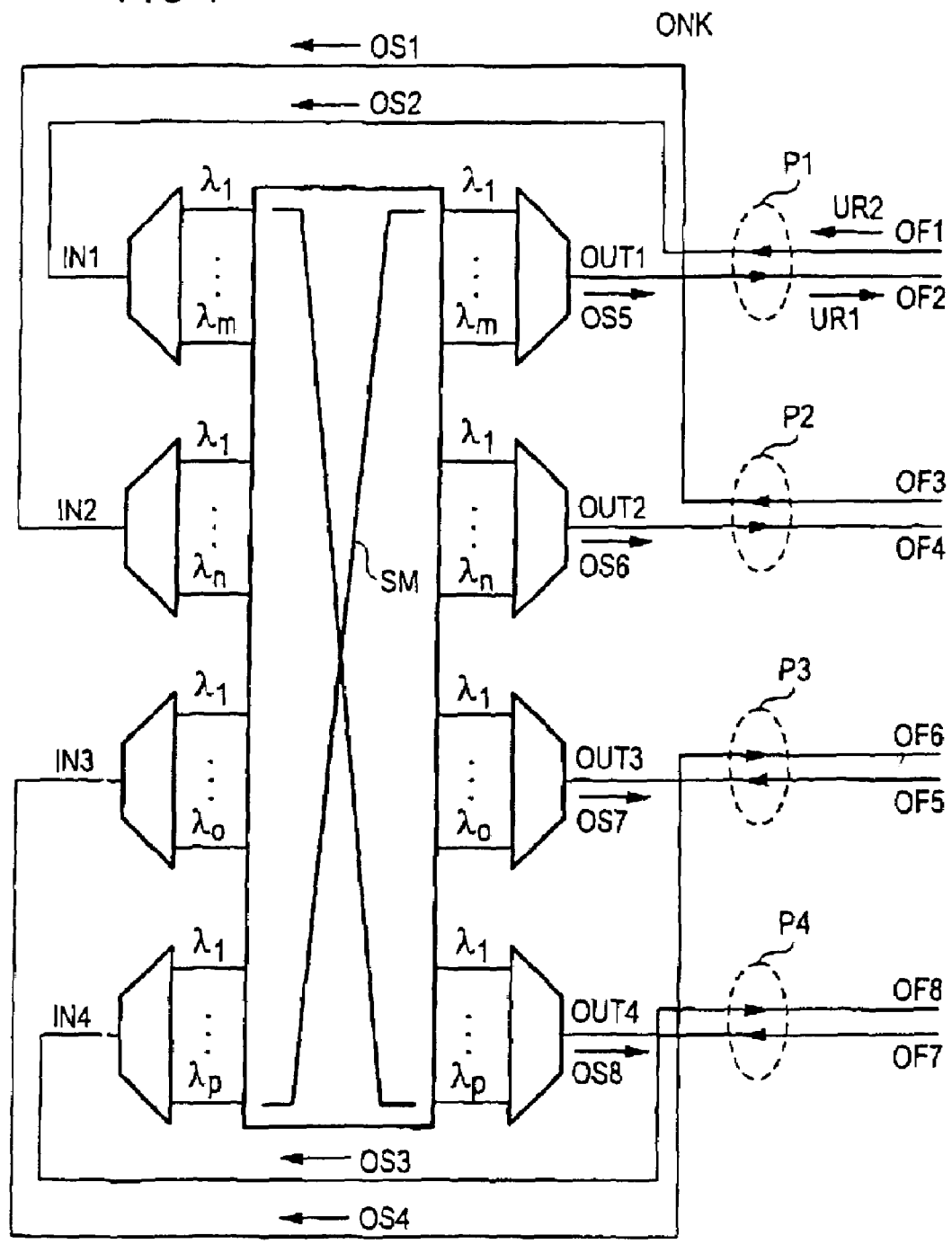
FIG. 1 shows, by way of example, an optical network node of the optical transmission system according to the present invention.

FIG. 1 shows, by way of example a switched optical network node ONK of an optical WDM transmission system ASON which has a number of unidirectional terminating units IN1 to IN4, OUT1 to OUT4. In the exemplary embodiment in question, according to FIG. 1, a first to a fourth unidirectional terminating unit OUT1 to OUT4 are illustrated with a first transmission direction UR1, and a first to a fourth further terminating unit IN1 to IN4 are illustrated with a second transmission direction UR2, the first transmission direction UR1 representing the forward transmission direction, and the second transmission direction UR2 which runs oppositely to the first transmission direction UR1 representing the backward transmission direction of the optical WDM transmission system ASON.

A multiplicity of unidirectional connection path channels $\lambda 1$ to $\lambda x$ which are routed to the switching matrix SM of the optical network node ONK are acquired from an optical WDM signal OS1 to OS4, or combined to form an optical WDM signal OS5 to OS8, via the first to fourth terminating units OUT1 to OUT4 and the first to fourth further terminating units IN1 to IN4. Here, the number of optical unidirectional connection path channels $\lambda 1$ to $\lambda m$, $\lambda 1$ to $\lambda n$, $\lambda 1$ to $\lambda 0$, $\lambda 1$ to $\lambda p$ from one unidirectional terminating unit IN1 to the further unidirectional terminating unit OUT1 vary. The optical unidirectional connection path channels $\lambda 1$ to $\lambda x$ of a unidirectional terminating unit IN1 to IN4, OUT1 to OUT4 each have different wavelengths $\lambda 1$ to $\lambda x$, it being possible to use virtually the same wavelengths $\lambda 1$ to $\lambda x$ in each unidirectional terminating unit IN1 to IN4 and OUT1 to OUT4.

In the exemplary embodiment according to FIG. 1, a first optical fiber OF1 is connected to the first unidirectional terminating unit IN1, and a second optical fiber OF2 is connected to the further unidirectional terminating unit OUT1. Analogously to this, a third optical fiber OF3 is connected to the second unidirectional terminating unit IN2, a fourth optical fiber OF4 is connected to the second further unidirectional terminating unit OUT2, a fifth optical fiber OF5 is connected to the third unidirectional terminating unit IN3, a sixth optical fiber OF6 is connected to the third further unidirectional terminating unit OUT3, a seventh optical fiber OF7 is connected to the fourth unidirectional terminating unit IN4 and an eighth optical fiber OF8 is connected to the fourth further unidirectional terminating unit OUT4. Here, the first, third, fifth and seventh optical transmission fibers OF1, OF3, OF5, OF7 have the first transmission direction OR1, and the second, fourth, sixth and eighth optical fibers OF2, OF4, OF6, OF8 have the second transmission direction OR2.

The first to eighth optical transmission fibers OF1 to OF8 are each connected to a unidirectional terminating unit of a further network node ONK' (not illustrated in FIG. 1) via a unidirectional connection path section FA, resulting the optical WDM transmission system ASON.

For setting up a bidirectional connection path BVP, an adaptation layer is provided via which at least two of the unidirectional terminating units IN1, OUT1 of the optical network node ONK which have a first and second transmission direction OR1, OR2 are combined to form one bidirectional terminating unit P1, and are addressed together via a signaling protocol, for example.

FIG. 2 illustrates, by way of example, the combination of unidirectional terminating units IN1 to IN4, OUT1 to OUT4 of an optical network node ONK which each have two opposite transmission directions UR1, UR2 to form, in each case, one bidirectional terminating unit BA1 to BA4. Here, for example, the first unidirectional terminating unit IN1 and the further first unidirectional terminating unit OUT1 are combined to form a first bidirectional terminating unit BA1. Analogously to this, the second unidirectional terminating unit IN2 and the second further unidirectional terminating unit OUT2 result in the second bidirectional terminating unit BA2. The third bidirectional terminating unit BA3 is composed of the third unidirectional terminating unit IN3 and the third further unidirectional terminating unit OUT3. Finally, the fourth unidirectional terminating unit IN4 and the fourth further unidirectional terminating unit OUT4 are combined in the fourth bidirectional terminating unit BA4.

The configuration of the optical network node ONK which is illustrated in FIG. 2 shows the bidirectional terminating units BA1 to BA4 of the optical network ONK which can be addressed using the adaptation layer. In addition, each bidirectional terminating unit BA1 to BA4 is assigned a port number P1 to P4 via the adaptation layer; i.e., the first bidirectional terminating unit BA1 can be addressed via the port number P1, the second bidirectional terminating unit BA2 can be addressed via the port number P2, the third bidirectional terminating unit BA3 can be addressed via the port number P3, and the fourth bidirectional terminating unit BA4 can be addressed via the port number P4, directly via the adaptation layer.

Furthermore, each of the bidirectional terminating units BA1 to BA4 has a number of optical unidirectional connection path channels $\lambda 1$ to $\lambda m$, $\lambda 1$ to $\lambda n$, $\lambda 1$ to $\lambda 0$, $\lambda 1$ to $\lambda p$ with respectively different wavelengths $\lambda 1$ to $\lambda x$. Using the adaptation layer, a number of bidirectional connection path channels L1 to Lx are assigned to a bidirectional terminating unit BA1 to BA4, two unidirectional connection path channels $\lambda 1$, $\lambda m$ with opposite transmission directions UR1, UR2 being addressed as one bidirectional connection path channel L1 to Lm via the adaptation layer. For this purpose, a label L1 to Lm, L1 to Ln, L1 to L0, L1 to Lp is assigned to one bidirectional connection path L1 to Lm, in each case, via the adaptation layer in a bidirectional terminating unit BA1 to BA4. This assignment can be carried out individually for each optical fiber link section FA between two optical network nodes ONK, ONK' and is stored in the optical WDM transmission system ASON in the form of an assignment table ZTa, ZTb.

FIGS. 3a and 3b illustrate two possible assignment tables ZTa, ZTb relating to the wavelength $\lambda 1$ to $\lambda x$ for the first and second transmission directions UR1 to UR2 of a bidirectional connection path channel L1 to L0, L1 to Lp. In the first assignment table ZTa illustrated in FIG. 3a, the same wavelength ($\lambda 1$, $\lambda 1$) to ($\lambda o$, $\lambda o$) is used, in each case, for the transmission in the forward and backward transmission directions; i.e., in the first and second transmission directions UR1, UR2. In contrast to this, in the second assignment table ZTb illustrated in FIG. 3b, unidirectional connection path channels which each have two different wavelengths ($\lambda 1$, $\lambda p$) to ($\lambda p$, $\lambda 1$) are combined to form one bidirectional connection path channel L1 to Lp, in which case, for example, for the first label L1 in the exemplary embodiment in question, a first wavelength $\lambda 1$ is provided for the forward transmission direction UR1, and a second wavelength $\lambda p$ is provided for the backward transmission direction UR2. In one preferred exemplary embodiment of the present invention, a single assignment table ZTa is defined for the entire optical WDM transmission system ASON, with reference to which table ZTa the assignment of the wavelengths $\lambda 1$ to $\lambda x$ for the forward and backward transmission directions UR1, UR2 is defined uniformly for the entire optical WDM transmission system ASON. As a result, it is possible, for example, to define the same wavelength for the transmission of the data in the forward and backward transmission directions.

Figure 4:
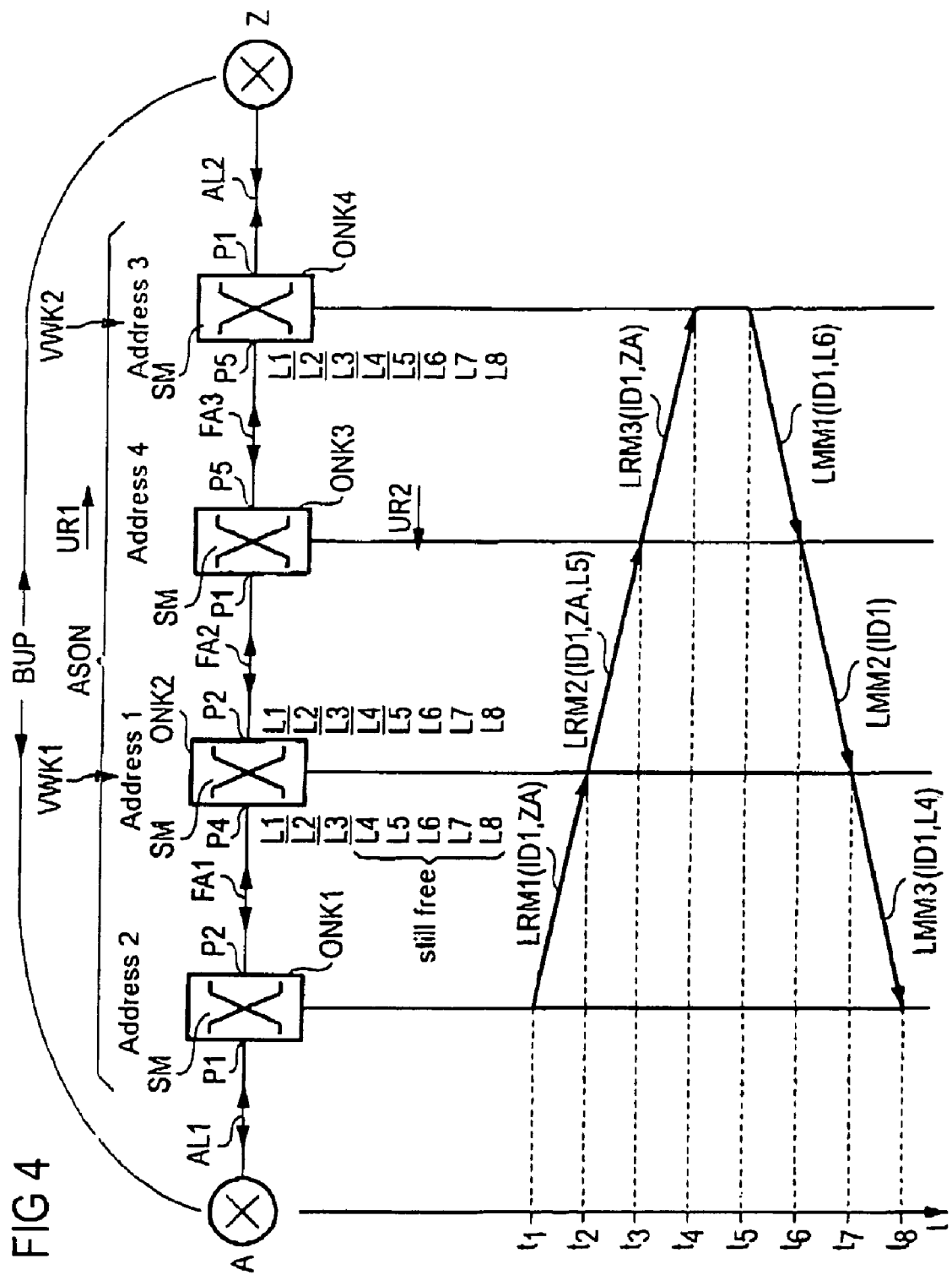
FIG. 4 shows, by way of example, the method according to the present invention for setting up a bidirectional connection path in the automatically switched optical transmission system.

FIG. 4 illustrates an automatically switched optical WDM transmission system ASON which has a first, second, third and fourth optical network node ONK1 to ONK4, as well as a first terminating node A and a second terminating node Z. In the exemplary embodiment illustrated, the first to fourth optical network nodes ONK1 to ONK4 each have an automatically switched switching matrix SM and wave converter WK (not illustrated in FIG. 4). For the method according to the present invention, it is not necessary to provide a wavelength converter WK in the respective optical network nodes ONK1 to ONK4; i.e., optical wavelength converters WK optionally can be provided in individual optical network nodes, in none of the optical network nodes ONK1 to ONK4, or in all of them. Furthermore, the first to fourth optical network nodes ONK1 to ONK4 each have different node addresses; i.e., each optical network node ONK1 to ONK4 can be unambiguously identified within the automatically switched optical WDM transmission system ASON via its network address, and thus can be addressed, for example, via a signaling protocol. In the exemplary embodiment illustrated, the first optical network node ONK1 has the address 2, the second optical network node ONK2 has the address 1, the third optical network node ONK3 has the address 4, and the fourth optical network node ONK4 has the address 3.

The first terminating node A, and at the same time the starting point for the setting up of the optical bidirectional connection path BVP, is connected via a first connecting line AL1 to the first bidirectional terminating unit P1 with the port number P1 of the first optical network node ONK1. The first bidirectional terminating unit P1 is connected via the switching matrix SM of the first optical network node ONK1 to the second bidirectional terminating unit P2 with the port number P2 which is connected via a first optical connection path section FA1 to the fourth bidirectional terminating unit P4 with the port number P4 of the second optical network node ONK2. The fourth bidirectional terminating unit P4 is routed via the switching matrix SM to the second bidirectional terminating unit P2 of the second optical network node ONK2. The second bidirectional terminating unit P2 of the second optical network node ONK2 is connected via the second optical connection path section FA2 to the first bidirectional terminating unit P1 with the port number P1 of the third optical network node ONK3, within which the first bidirectional terminating unit P1 is connected via the switching matrix SM to the fifth bidirectional terminating unit P5. The fifth bidirectional terminating unit P5 of the third optical network node NK3 is connected via a third optical connection path section FA3 to the fifth bidirectional terminating unit P5 of the fourth optical network node ONK4. Within the fourth optical network node ONK4, the fifth bidirectional terminating unit P5 is connected via the switching matrix SM to the first bidirectional terminating unit P1 of the fourth optical network node ONK4 which is connected via a second optical connecting line AL2 to the destination node; i.e., the second terminating node Z.

In order to set up a bidirectional connection path BVP from the first terminating node A to the second terminating node Z via the first to fourth optical network nodes ONK1 to ONK4 (i.e., via the first, second and third optical connection path sections FA1 to FA3), an optical administration network node VWK1, VWK2 which is responsible for the assignment of the connection path channels L1 to L8 is determined in each optical network node ONK1 to ONK4. Such an optical administration network node VWK1, VWK2 administers at least one optical connection path section FA1, FA2 in relation to the assignment of available optical connection path sections L1 to L8.

In the exemplary embodiment illustrated, the optical administration nodes VWK1, VWK2 are determined via the node address of the first to fourth optical network nodes ONK1 to ONK4. Here, for example, the network node ONK1 to ONK4 with the smallest node address in relation to its two adjacent optical network nodes ONK1 to ONK4 (i.e., the ones which are connected to it via optical connection path sections FA1 to FA3), are determined as administration nodes VWK1, VWK2 for the connection path sections FA1, FA2 in question. In the exemplary embodiment in question, the second optical network node ONK2 has the smallest node address with the value 1, and is thus the first administration node VWK1 on the bidirectional connection path BVP from the first terminating node A to the second terminating node Z; i.e., the node addresses of the first optical network node ONK1 and of the connected third optical network node ONK3, with the values 2 and 4, are larger than the node address of the second optical network node ONK2 and, therefore, have not been determined as administration network nodes but rather as nonadministration network nodes. Analogously to the procedure described, in the exemplary embodiment illustrated, the fourth optical network node ONK4 is determined as the second optical administration network node VWK2 because its node address with the value 3 is smaller than the node address of the third optical network node ONK3 with the value 4 which is connected to it via the third connection path section FA3.

The first and third optical network nodes ONK1, ONK3 are, therefore, determined as not being optical administration network nodes VWK1, VWK2, or as being nonadministration network nodes, and the second and fourth optical network nodes ONK2, ONK4 are determined as being first and second optical administration nodes VWK1, VWK2. In the exemplary embodiment illustrated, the first optical administration node VWK1 is responsible for the assignment of the connection path channels L1 to L8 on the first and on the second optical connection path sections FA1, FA2. Analogously to this, the second optical administration network node VWK2 is responsible for the assignment of the connection path channels L1 to L8 on the third optical connection path section FA3.

In order to set up a bidirectional connection path BVP from the first terminating node A to the second terminating node Z, a "label request message" LRM (Id1, ZA), which contains, inter alia, a path identification number ID1 and a destination address ZA, is formed from the first terminating node A to the second terminating node Z in the first optical network node ONK1, which is not an administration node VWK1, VWK2. Here, the path identification number ID1 unambiguously characterizes the bidirectional connection path BVP, and the destination node address unambiguously characterizes the address of the second terminating node Z, at which address the bidirectional connection path BVP to be set up terminates.

In the first optical administration network node VWK1, the bidirectional connection path channels L1 to L8 which are available for setting up a bidirectional connection path BVP both on the first optical connection path section FA1 and on the second optical connection path section FA2 are determined, and the available labels L1 to L8 which are assigned to the available bidirectional connection path channels L1 to L8 are determined via the adaptation layer. An available label L1 to L8 is selected for the respective first or second optical connection path section FA1, FA2 from the set of available bidirectional connection path channels or their assigned labels L1 to L8.

In the exemplary embodiment according to FIG. 4, in the first optical administration node VWK1, for example, the first to third labels L1 to L3 are already occupied for the first optical connection path section FA1, and the fourth to eighth labels L4 to L8 are still available for the connection setup. In addition, the fifth to eighth labels L5 to L8 are still available for the setting up of a bidirectional connection path BVP via the second optical connection path section FA2, whereas the first to fourth labels L1 to L4 are already being used. Furthermore, the sixth to eighth labels L6 to L8 are available for the connection setup via the third connection path section FA3, while the first to fifth labels L1 to L5 are occupied. In the exemplary embodiment in question, the fourth bidirectional connection path channel L4 and the available fourth label L4 are selected for the setting up of the bidirectional connection path BVP for the first optical connection path section FA1, the fifth bidirectional connection path channel L5 and the fifth available label L5 are selected for the second optical connection path section FA2, and the sixth bidirectional connection path channel L6 and the sixth available label L6 are selected for the third optical connection path section FA3.

For this purpose, at the first time t1, a first "label request message" LRM1(ID1, ZA), which contains the path identification number ID1 and the destination node address ZA, is formed by the first optical network node ONK1 or nonadministration network node. The "label request message" LRM1(ID1, ZA) is then transmitted in the transmission direction UER1 (i.e., upstream), to the first administration network node VWK1, which, as already described, selects the fourth bilateral connection path channel 14 for the setting up of the bidirectional connection path BVP on the first optical connection path section FA1. The selected fourth label L4 is signaled to the first optical network node ONK1 at a later time.

At the second time t2, a second "label request message" LRM2(ID1, ZA, L4), into which, however, the fifth bidirectional connection path channel L5 which is selected for the second optical fiber link section FA2 and the selected fifth label L5 are inserted in addition to the path identification number ID1 and the destination node address Z1, is formed in the second optical network node ONK2 or first administration network node VWK1. The second "label request message" LRM2(ID1, ZA, L4) is transmitted via the second connection path section FA2 to the third optical network node ONK3, and the assignment of the fourth label L4 for the second optical connection path section FA2 is signaled to the third optical network node ONK3 at the third time t3. The switching matrix SM is then set in the third optical network node ONK3 in accordance with the assignment of the fifth label L5.

Subsequently, a third "label request message" LRM3(ID1 ZA) for the third optical connection path section FA3 is formed by the third network node ONK3 (nonadministration network node) also at the third time t3, and transmitted to the second administration network node VWK2 or the fourth optical network node ONK4. The third "label request message" LRM3(ID1, ZA) includes the path identification number ID1 and the destination node address ZA of the second terminating node Z.

At the fourth time t4, the third "label request message" LRM3(ID1, ZA) is received in the fourth optical network node ONK4 or second administration network node VWK2 and evaluated. The second administration network node VWK2 determines the connection path channels L6 to L8 which are available on the third connection path section FA3, and in the exemplary embodiment selects the sixth bidirectional connection path channel or the sixth label L6 for the connection setup. According to the selected sixth bidirectional connection path channel L6, the switched settings in the switching matrix SM of the fourth optical network node ONK4 are set in such a way that the last path section, running via the second connecting line AL2 to the second terminating node Z via the switching matrix SM of the fourth optical network node ONK4 to the third optical fiber link section FA3, of the bidirectional connection path BVP is set up.

At the fourth time t4, a first "label mapping message" LMM1(ID1, L6) which contains the path identification number ID1 and the sixth label L6 selected for the third connection path section FA3 is formed in the second administration node VWK2. The first "label mapping message" LMM1 (ID 1, L6) is transmitted to the third network node ONK3 in the opposite transmission direction UE2 (i.e., downstream), at the fifth time t5, and evaluated in the third optical network node ONK3 at the sixth time t6. Subsequently, the necessary switched settings are made in the switching matrix SM of the third optical network node ONK3 in accordance with the sixth label L6 assigned to the third optical network node ONK3.

In addition, at the sixth time t6, a second "label mapping message" LMM2(ID1) which, in the exemplary embodiment in question, includes only the path identification number ID1 because the connection path channel L5 which is defined for the second connection path section FA2 already has been signaled to the third optical network node ONK3 with the second "label request message" LRM2(ID1, ZA, L5), is formed in the third optical network node ONK3. The second "label mapping message" LMM2(ID1) is transmitted in the opposite transmission direction UER2 to the second optical network node ONK2 or the first administration network node VWK1.

In the second optical network node ONK2 or first optical administration network node VWK1, the assignment of the fifth label L5, previously selected by first administration node VWK1, is correspondingly set for the second connection path section FA2 by the switching matrix SM of the first administration node VWK1 at the seventh time t7 via the transferred second "label mapping message" LMM2 (ID1). In addition, the switching matrix SM in the first administration network node VWK1 is adapted to the assignment of the fourth label L4 which is selected for the first connection path section FA1.

In addition, a third "label mapping message" LMM3(ID1, L4), which contains the path identification number ID1 and the fourth label L4 selected for the first bidirectional connection path section FA1, is formed by the first administration network node VWK1 at the seventh time t7. The third "label mapping message" LMM3(ID1, L4) is transmitted to the first optical network node ONK1.

In the first optical network node ONK1, the third "label mapping message" LMM3(ID1, L4) is received at the eighth time t8, and evaluated by it. As a result, analogously to the previous method steps, the assignment of the fourth connection path channel or of the fourth label L4 which is provided on the first optical connection path section FA1 is indicated to the first optical network node ONK1 using the third "label mapping message" LMM3(ID1, L4), and the path identification number ID1 is transmitted for the unambiguous identification of the first "label mapping message" LMM(ID1, L4).

After the evaluation of the third "label mapping message" LMM3(ID1, L4), the switching matrix SM in the first optical network node ONK1 is set in accordance with the assignment of the fourth label L4. The bidirectional connection path BVP is thus set up, and the connection setup and, subsequently, the transmission of data D can be carried out via the bidirectional connection path BVP which is set up.

Although the present invention has been described with reference to specific embodiments, those of skill in the art will recognize that changes may be made thereto without departing from the spirit and scope of the present invention as set forth in the hereafter appended claims.

The invention claimed is:

1. A method for setting up at least one bidirectional connection path from a first optical network node to an N-th optical network node via at least one connection path section in an optical transmission system, the method comprising the steps of:
    determining an optical administration network node, which is responsible for assignment of bidirectional connection path channels on the at least one connected connection path section and which is connected to the respective connection path section, in each of the optical network nodes;
    transmitting a label request message, which contains a path identification number and a destination node address of the bidirectional connection path to be set up, in a transmission direction along the bidirectional connection path, in each case from one of the optical network nodes to the following optical network node;
    determining the bidirectional connection path channels available for the respective connection path section in the optical administration network node via the labels made available by an adaptation layer, with one available label being selected per connected connection path section, and a label which is selected for the connection path section between the administration network node and the following nonadministration network node is signaled to the nonadministration network node via the label request message;
    transmitting, in an opposite transmission direction along the bidirectional connection path, a label mapping message which contains a path identification number from one of the optical network nodes to the following optical network node, the label selected for the connection path section between the administration network node and the following nonadministration network node being signaled by the administration network node to the following nonadministration network node via the label mapping message; and
    switching the bidirectional connection path channel defined by the transferred label through to the optical nonadministration network node.

2. The method for setting up at least one bidirectional connection path as claimed in claim 1, the method further comprising the step of defining the wave lengths of the transmission channels of a bidirectional connection path channel, which are provided both for the transmission direction and the opposite transmission direction, via an assignment table.

3. The method for setting up at least one bidirectional connection path as claimed in claim 1, wherein the step of determining an optical administration network node includes evaluating node addresses of the optical network nodes.

* * * * *